(12) United States Patent
Liu

(10) Patent No.: US 8,516,920 B2
(45) Date of Patent: Aug. 27, 2013

(54) ROBOT ARM ASSEMBLY

(75) Inventor: Zhen-Xing Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 236 days.

(21) Appl. No.: 13/109,190

(22) Filed: May 17, 2011

(65) Prior Publication Data
US 2012/0103127 A1 May 3, 2012

(30) Foreign Application Priority Data
Oct. 27, 2010 (CN) .......................... 2010 1 0521540

(51) Int. Cl.
*B25J 17/00* (2006.01)

(52) U.S. Cl.
USPC .......... 74/490.06; 74/490.05; 901/28; 901/29

(58) Field of Classification Search
USPC ............... 74/490.01, 490.02, 490.03, 490.04, 74/490.05, 490.06; 414/732, 736; 901/21, 901/23, 27, 28, 29
See application file for complete search history.

(56) References Cited

U.S. PATENT DOCUMENTS

| | | | | |
|---|---|---|---|---|
| 4,637,773 | A * | 1/1987 | Nakashima et al. | 414/732 |
| 4,732,526 | A * | 3/1988 | Nakashima et al. | 414/730 |
| 4,750,858 | A * | 6/1988 | Nakashima et al. | 414/732 |
| 4,784,010 | A * | 11/1988 | Wood et al. | 74/490.04 |
| 4,806,066 | A * | 2/1989 | Rhodes et al. | 414/729 |
| 4,903,536 | A * | 2/1990 | Salisbury et al. | 74/89.22 |
| 5,046,375 | A * | 9/1991 | Salisbury et al. | 74/89.22 |
| 5,207,114 | A * | 5/1993 | Salisbury et al. | 74/479.01 |
| 8,234,949 | B2 * | 8/2012 | Pan et al. | 74/490.04 |
| 2008/0229862 | A1* | 9/2008 | Nakamoto | 74/490.04 |
| 2010/0162846 | A1* | 7/2010 | Lee et al. | 74/490.04 |
| 2010/0170362 | A1* | 7/2010 | Bennett et al. | 74/490.04 |
| 2011/0126651 | A1* | 6/2011 | Pan et al. | 74/89.2 |
| 2011/0206481 | A1* | 8/2011 | Al-Mouhamed et al. | 414/5 |

* cited by examiner

*Primary Examiner* — David M Fenstermacher
(74) *Attorney, Agent, or Firm* — Altis Law Group, Inc.

(57) ABSTRACT

A wrist housing, a wrist rotatably connected to the wrist housing, a first driver, a first transmission mechanism, a rotary member, a second driver, and a second transmission mechanism makes a robot arm assembly. The wrist housing is hollow. The first driver is assembled within the wrist housing for driving the wrist to rotate relative to the wrist housing along a first rotary axis. The first transmission mechanism is also assembled within the wrist housing and is positioned between the wrist and the first driver. The rotary member is rotatably assembled to a distal end of the wrist along a second rotary axis. The second driver is assembled within the wrist housing for driving the rotary member to rotate. The second transmission mechanism is assembled within the wrist housing, and is positioned between the second driver and the rotary member.

19 Claims, 4 Drawing Sheets

ROBOT ARM ASSEMBLY

BACKGROUND

1. Technical Field

This disclosure relates to robotics, and particularly, to a robot arm assembly.

2. Description of Related Art

Industrial robots are widely used in many fields such as industrial manufacturing, repair, and testing. A commonly used robot includes a plurality of individual robot arms, with every two robot arms connected by a joint structure. Each robot arm is driven by a driving assembly to rotate along a corresponding rotating axis. The existing conventional driving assembly is generally assembled within the robot arm, and includes a driving motor and a motor reducer. The conventional driving assembly occupies a large amount of space within the robot arm and is relatively heavy. Most of the weight is positioned or exerted on an output shaft of the motor reducer such that the integral strength of the robot arm is reduced over time. In addition, the existing robot arm assembly occupies also a relatively large amount of space and is also heavy.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the robot arm assembly. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
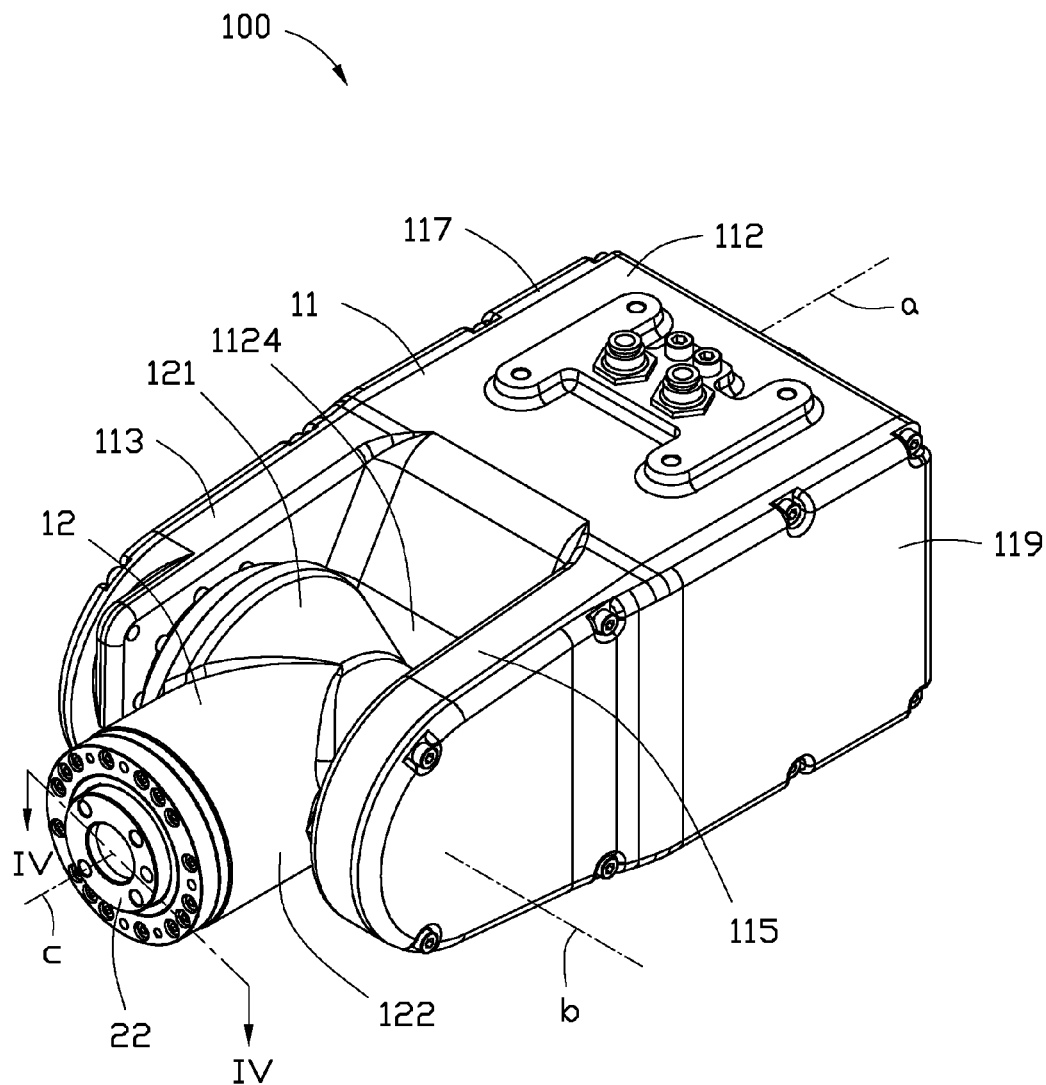
FIG. 1 is an assembled perspective view of an embodiment of a robot arm assembly.
Figure 2:
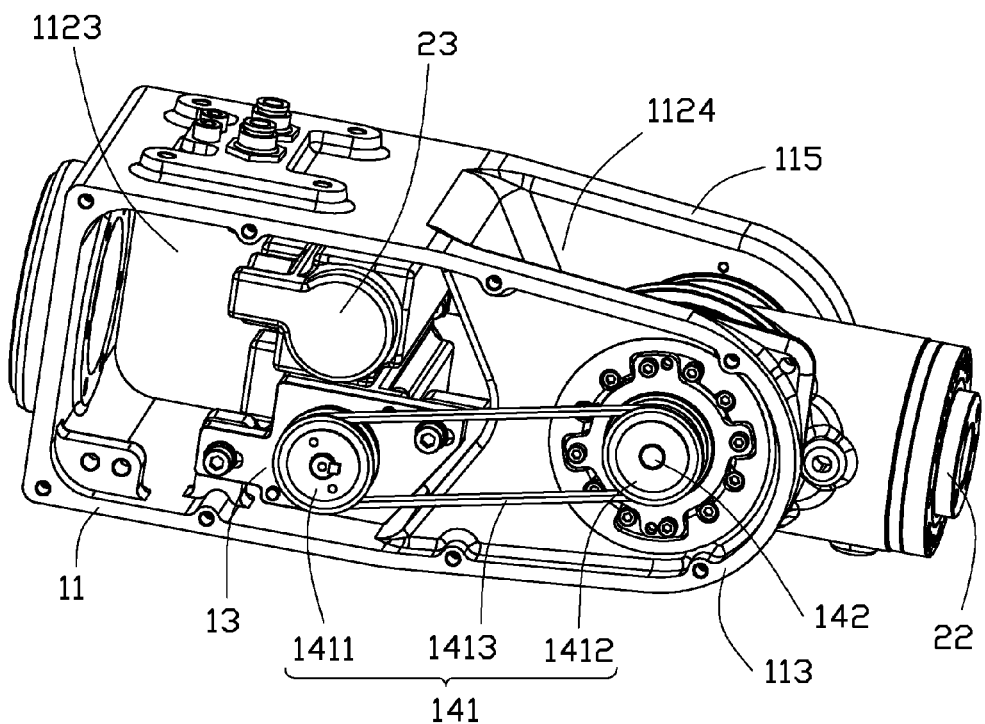
FIG. 2 is a partial assembled perspective view of the robot arm assembly of FIG. 1, wherein, a side cover is detached from the robot arm assembly.
Figure 3:
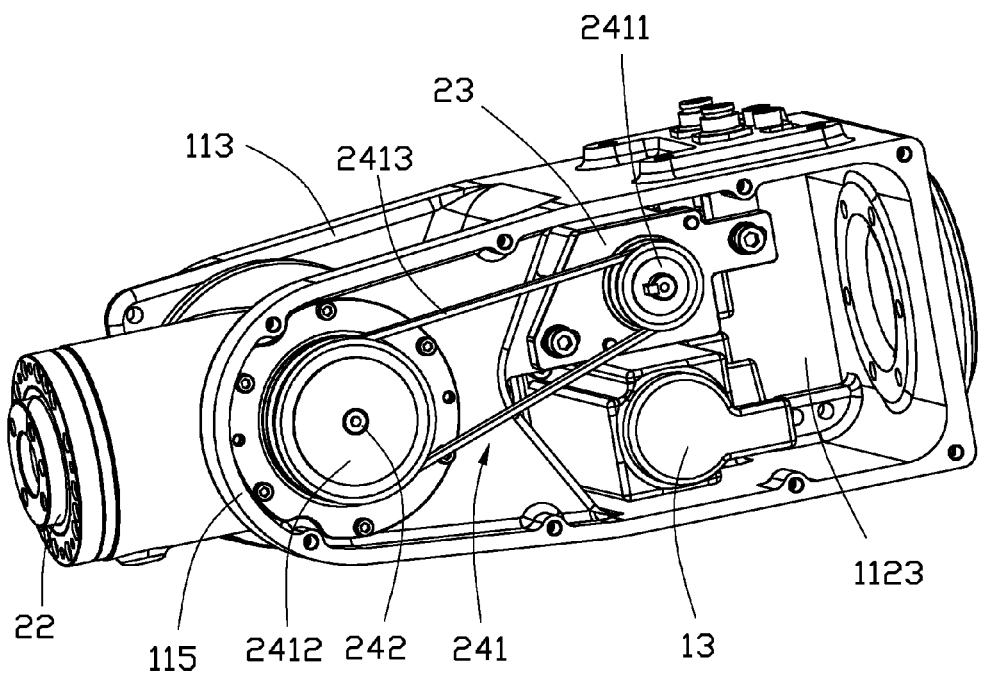
FIG. 3 is another partial assembled perspective view of the robot arm assembly of FIG. 1 shown from another aspect, wherein, another side cover is detached from the robot arm assembly.
Figure 4:
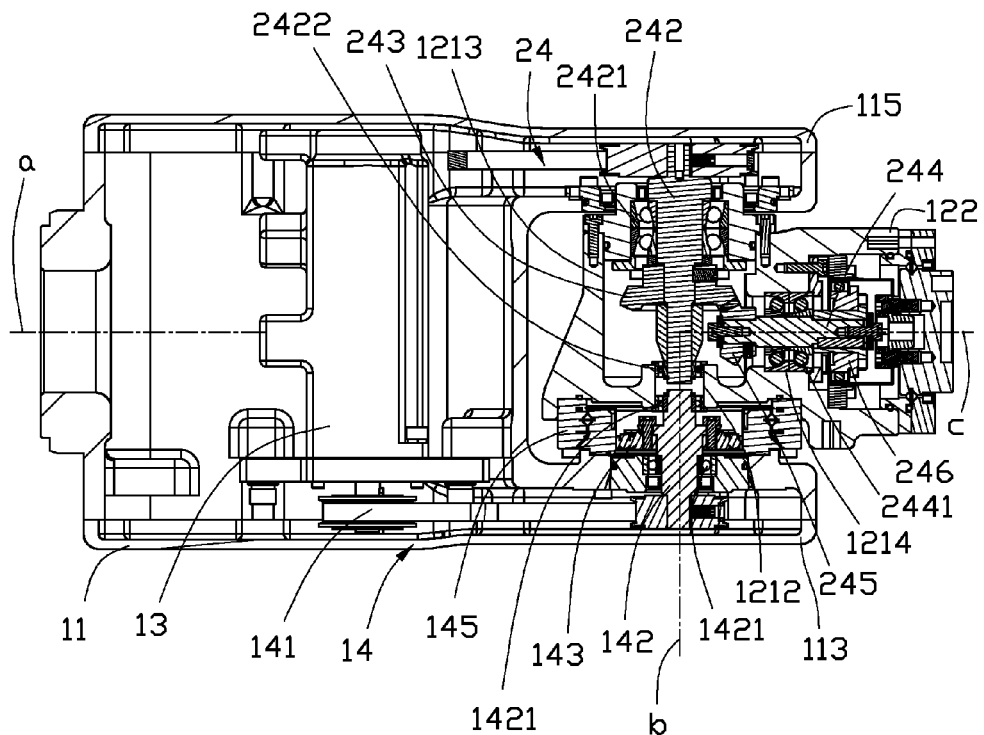
FIG. 4 is a cross-section of the robot arm assembly of FIG. 1, taken along line IV-IV.

Referring to FIGS. 1 through 4, an embodiment of a robot arm assembly 100 is shown. The robot arm assembly 100 includes a wrist housing 11, a wrist 12 rotatably connected to the wrist housing 11, a first driver 13, a first transmission mechanism 14, a rotary member 22, a second driver 23, and a second transmission mechanism 24. The wrist housing 11 is hollow shaped, and the wrist housing 11 can be driven to rotate along a rotary axis a. The wrist 12 is rotatably assembled to one end of the wrist housing 11. The first driver 13 is assembled within the wrist housing 11 for driving the wrist 12 to rotate relative to the wrist housing 11 along a rotary axis b. The first transmission mechanism 14 is also assembled within the wrist housing 11, and is positioned between the wrist 12 and the first driver 13 for transferring a rotation movement of the first driver 13 to the wrist 12. The rotary member 22 is rotatably assembled to a distal end of the wrist 12 along a rotary axis c. The second driver 23 is assembled within the wrist housing 11 for driving the rotary member 22 to rotate along the rotary axis c. The second transmission mechanism 24 is assembled within the wrist housing 11, and is positioned between the second driver 23 and the rotary member 22 for transferring a rotation movement of the second driver 23 to the rotary member 22.

In one embodiment, the robot arm assembly 100 is applied to a six-axis robot (not shown), the wrist housing 11, the wrist 12 and the rotary member 22 can be respectively driven to rotate along rotary axes a, b, and c. The rotary member 22 is configured for assembling an actuator such as a cutter, or a fixture. The rotary axis a and the rotary axis c are both perpendicular to the rotary axis b. The rotary axes a, b and c can intersect with each other to a point.

The wrist housing 11 includes a main bracket 112, two support arms 113, 115, and two covers 117, 119. The two support arms 113, 115 are opposite to each other, and parallelly extend out from one end of the main bracket 112 along a direction parallel to two sides of the main bracket 112. A receiving hole 1123 is defined through the two sides of the main bracket 112 along a direction perpendicular to the two support arms 113, 115, namely, a direction perpendicular to the rotary axis a, of the main bracket 112, and is positioned adjacent to the other end of the main bracket 112 opposite to the two support arms 113, 115. A receiving space 1124 is formed between the two support arms 113, 115 for assembling the wrist 12. The two covers 117, 119 are mounted on two opposite sides of the wrist housing 11 for covering the receiving hole 1123 and the two support arms 113, 115.

The first driver 13 and the second driver 23 are both assembled within the receiving hole 1123 of the wrist housing 11. Such that, a barycenter of the whole robot arm assembly 100 is located adjacent to the main bracket 112 of the wrist housing 11, and the weight of the rotary member 22 is decreased, and thus, facilitating precise control to the rotary member 22. In addition, as the second driver 23 is assembled within the receiving hole 1123 of the wrist housing 11, a plurality of connecting cables (not shown) which are connected to the second driver 23 are not needed to pass through the wrist 12, such that, the connecting cables thereby avoid being damaged during usage. In one embodiment, the first driver 13 and the second driver 23 are both servo motors, and are both assembled adjacent to and parallel to each other within the wrist housing 11.

The wrist 12 is substantially hollow T-shaped, and is rotatably assembled to one end of the wrist housing 11, along the rotary axis b perpendicular to the axis a of the main bracket 112. The wrist 12 includes a first sleeve body 121 and a second sleeve body 122 substantially perpendicularly intersecting with the first sleeve body 121. The first sleeve body 121 is received within the receiving space 1124 formed by the two support arms 113, 115. Two ends of the first sleeve body 121 are rotatably assembled to the two support arms 113, 115, respectively. A distal end of the second sleeve body 122 is exposed to the outer side of the receiving space 1124 away from the main bracket 112. The rotary member 22 is rotatably assembled to the distal end of the second sleeve body 122 along the rotary axis c perpendicular to the rotary axis b, for connecting with other tools such as cutting tool, or fixture.

In one embodiment, two ends of the first sleeve body 121 define a first shaft hole 1212 and a second shaft hole 1213 along the rotary axis b direction, respectively. The second sleeve body 122 defines a third shaft hole 1214 along the rotary axis c direction. The third shaft hole 1214 is perpendicular to and communicates with the first and second shaft holes 1212, 1213.

The first transmission mechanism 14 is assembled within the wrist housing 11, and is positioned between the wrist 12 and the first driver 13 for transferring a rotation movement of the first driver 13 to the wrist 12. The first transmission mechanism 14 includes a first belt transmission assembly 141, a first rotary shaft 142, and a first harmonic reducer 143. The first belt transmission assembly 141 is assembled within the wrist housing 11, and positioned at a same side as the support arm 113 for coupling the first driver 13 and the wrist 12 together. The first rotary shaft 142 is assembled into the first shaft hole 1212 of the wrist 12 and the support arm 113 of the wrist housing 11 by a pair of deep groove ball bearings 1421. The first harmonic reducer 143 is coupled to the first rotary shaft 142 for reducing a rotating speed of the wrist 12 transmitted by the first belt transmission assembly 141 from the first driver 13. A cross roller bearing 145 is positioned between the first harmonic reducer 143 and the wrist 12 for supporting the wrist 12 and ensuring a stable movement to the wrist 12.

In one embodiment, the first belt transmission assembly 141 includes an input belt wheel 1411, an output belt wheel 1412, and a transmission belt 1413. The input belt wheel 1411 is coupled to an output end of the first driver 13 and is driven by the first driver 13 to rotate. The output belt wheel 1412 is secured to a distal end of the first rotary shaft 142. The transmission belt 1413 is mounted to the input belt wheel 1411 and the output belt wheel 1412 for connecting the input belt wheel 1411 and the output belt wheel 1412 together. Thus, as in use, the input belt wheel 1411 is driven to rotate by the first driver 13, and the output belt wheel 1412 is then driven to rotate together with the input belt wheel 1411 by the transmission belt 1413. By means of the first belt transmission assembly 141 and the first harmonic reducer 143, a rotating speed of the first driver 13 can be efficiently reduced to a desired rotating speed and finally be transmitted to the first rotary shaft 142.

The second transmission mechanism 24 is assembled within the wrist housing 11, and is positioned between the wrist 12 and the second driver 23 for transferring the rotation movement of the second driver 23 to the wrist 12. In one embodiment, the second transmission mechanism 24 includes a second belt transmission assembly 241, a second rotary shaft 242, a drive bevel gear 243, a third rotary shaft 244, a driven bevel gear 245 and a second harmonic reducer 246.

The second belt transmission assembly 241 has a same structure as the first belt transmission assembly 141. The second belt transmission assembly 241 is also assembled within the wrist housing 11 and is positioned at a same side as the support arm 115 opposite to the first belt transmission assembly 141, for coupling the second driver 23 and the wrist 12 together. One end of the second rotary shaft 242 is assembled into the second shaft hole 1213 of the wrist 12 by a pair of angular contact bearings 2421, and the other end of the second rotary shaft 242 is assembled into the first shaft hole 1212 of the wrist 12 by a pair of deep groove ball bearings 2422.

The drive bevel gear 243 is mounted to a substantially middle portion of the second rotary shaft 242 and received within the first sleeve body 121. The third rotary shaft 244 is assembled within the third shaft hole 1214 of the second sleeve body 122 of the wrist 12 with a pair of angular contact bearings 2441. The driven bevel gear 245 is mounted to one end of the third rotary shaft 244 and engages with the drive bevel gear 243 mounted to the second rotary shaft 242. Thus, as the second rotary shaft 242 is driven to rotate with the second driver 23, the third rotary shaft 244 is driven to rotate together with the second rotary shaft 242. The rotary member 22 is mounted to the other end of the third rotary shaft 244 opposite to the main bracket 112. The second harmonic reducer 246 is coupled to the third rotary shaft 244 for reducing a rotating speed of the third rotary shaft 244 transmitted by the second belt transmission assembly 241 from the second driver 23.

The second belt transmission assembly 241 includes an input belt wheel 2411, an output belt wheel 2412, and a transmission belt 2413. The input belt wheel 2411 is coupled to an output end of the second driver 23 and is driven by the second driver 23 to rotate. The output belt wheel 2412 is secured to a distal end of the second rotary shaft 242. The transmission belt 2413 is mounted to the input belt wheel 2411 and the output belt wheel 2412 for connecting the input belt wheel 2411 and the output belt wheel 2412 together. Such that, the input belt wheel 2411 is driven to rotate with the second driver 23, and the output belt wheel 2412 is then driven to rotate together with the input belt wheel 2411 by the transmission belt 2413. By means of the second belt transmission assembly 241 and the second harmonic reducer 246, a rotating speed of the second driver 23 can be efficiently reduced to a desired rotating speed and finally be transmitted to the second and third rotary shafts 242, 244.

It is understood that the two covers 117, 119 of the wrist housing 11 can also be omitted.

It is to be understood, however, that even through numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A robot arm assembly, comprising:
   a wrist housing, the wrist housing being hollow and comprising a main bracket, and two support arms parallelly extending out from an end of the main bracket along a direction parallel to two sides of the main bracket;
   a wrist rotatably connected to the wrist housing along a first axis and assembled between the two support arms of the wrist housing, the wrist comprising a first sleeve body and a second sleeve body substantially perpendicularly intersecting with the first sleeve body, two ends of the first sleeve body being rotatably assembled to the two support arms, respectively, the two ends of the first sleeve body respectively defining a first shaft hole and a second shaft hole along the first axis;
   a first driver assembled within the wrist housing for driving the wrist to rotate relative to the wrist housing;
   a first transmission mechanism assembled within the wrist housing for transferring a rotation movement of the first driver to the wrist;
   a rotary member rotatably assembled to a distal end of the second sleeve body of the wrist;
   a second driver assembled within the wrist housing for driving the rotary member to rotate along a second rotary axis; and
   a second transmission mechanism assembled within the wrist housing, for transferring a rotation movement of the second driver to the rotary member, wherein the second transmission mechanism comprises a second rotary shaft rotatably assembled into the first shaft hole and the second shaft hole of the first sleeve body by opposite ends, the rotary member is connected to the second rotary shaft, the second driver is mounted upon the first driver, and output ends of the first driver and the second driver extend away from each other.

2. The robot arm assembly as claimed in claim 1, wherein the second rotary axis is perpendicular to the first rotary axis, the first transmission mechanism is positioned between the wrist and the first driver; the second transmission mechanism is positioned between the second driver and the rotary member.

3. The robot arm assembly as claimed in claim 1, wherein a receiving space is defined between the two support arms; the wrist is rotatably assembled to the wrist housing and received in the receiving space.

4. The robot arm assembly as claimed in claim 3, wherein the main bracket defines a receiving hole, the first driver and the second driver are both assembled within the receiving hole of the wrist housing and positioned adjacent to and parallel to each other.

5. The robot arm assembly as claimed in claim 4, wherein the wrist is substantially hollow T-shaped, the distal end of the second sleeve body is exposed to the outer side of the receiving space away from the main bracket.

6. The robot arm assembly as claimed in claim 5, wherein the first transmission mechanism comprises a first belt transmission assembly, and a first rotary shaft, the first belt transmission assembly is assembled within the wrist housing and positioned at a same side as one support arm for coupling the first driver and the wrist together; the first rotary shaft is assembled into the first shaft hole of the wrist and the support arm of the wrist housing.

7. The robot arm assembly as claimed in claim 6, wherein the first transmission mechanism further comprises a first harmonic reducer coupled to the first rotary shaft for reducing a rotating speed of the wrist transmitted by the first belt transmission from the first driver.

8. The robot arm assembly as claimed in claim 7, wherein the first transmission mechanism further comprises a cross roller bearing positioned between the first harmonic reducer and the wrist for supporting the wrist.

9. The robot arm assembly as claimed in claim 6, wherein the first belt transmission assembly comprises an input belt wheel, an output belt wheel, and a transmission belt; the input belt wheel is coupled to the output end of the first driver and is driven by the first driver to rotate; the output belt wheel is secured to a distal end of the first rotary shaft; the transmission belt is mounted to the input belt wheel and the output belt wheel for connecting the input belt wheel and the output belt wheel together.

10. The robot arm assembly as claimed in claim 6, wherein the second transmission mechanism further comprises a second belt transmission assembly, a drive bevel gear mounted to the second rotary shaft, a third rotary shaft, and a driven bevel gear mounted to the third rotary shaft; the second belt transmission assembly is positioned at a same side as the other support arm opposite to the first belt transmission assembly, for coupling the second driver and the wrist together; the second rotary shaft is assembled within the first sleeve body; the second sleeve body defines a third shaft hole perpendicular to and communicates with the first and second shaft holes; the third rotary shaft is assembled within the third shaft hole with the driven bevel gear engaging with the drive bevel gear; the rotary member is mounted to a distal end of the third rotary shaft.

11. A robot arm assembly, comprising:
a wrist housing comprising a main bracket, and two support arms parallelly extending out from an end of the main bracket along a direction parallel to two sides of the main bracket;
a wrist rotatably connected to the wrist housing and assembled between the two support arms of the wrist housing, and assembled between the two support arms of the wrist housing, the wrist comprising a first sleeve body and a second sleeve body substantially perpendicularly intersecting with the first sleeve body, two ends of the first sleeve body being rotatably assembled to the two support arms, respectively, the two ends of the first sleeve body respectively defining a first shaft hole and a second shaft hole along a rotary axis of the wrist;
a first driver assembled within the wrist housing for driving the wrist to rotate;
a first transmission mechanism assembled within the wrist housing and positioned between the wrist and the first driver for transferring a rotation movement of the first driver to the wrist;
a rotary member rotatably assembled to the wrist; and
a second driver assembled within the wrist housing for driving the rotary member to rotate along a direction perpendicular to the first driver, wherein the second transmission mechanism comprises a second rotary shaft rotatably assembled into the first shaft hole and the second shaft hole of the first sleeve body by opposite ends, the rotary member is connected to the second rotary shaft, the second driver is mounted upon the first driver, and output ends of the first driver and the second driver extend away from each other.

12. The robot arm assembly as claimed in claim 11, wherein a receiving space is defined between the two support arms; the wrist is rotatably assembled to the wrist housing and received within the receiving space.

13. The robot arm assembly as claimed in claim 12, wherein the main bracket defines a receiving hole, the first driver and the second driver are both assembled within the receiving hole of the wrist housing and positioned adjacent to and parallel to each other.

14. The robot arm assembly as claimed in claim 13, wherein the first transmission mechanism comprises a first belt transmission assembly, and a first rotary shaft, the first belt transmission assembly is assembled within the wrist housing and positioned at a same side as one support arm for coupling the first driver and the wrist together; the first rotary shaft is assembled into the first shaft hole of the wrist and the support arm of the wrist housing by a pair of deep groove ball bearings.

15. The robot arm assembly as claimed in claim 14, wherein the first transmission mechanism further comprises a first harmonic reducer coupled to the first rotary shaft for reducing a rotating speed of the wrist transmitted by the first belt transmission from the first driver.

16. The robot arm assembly as claimed in claim 15, wherein the first transmission mechanism further comprises a cross roller bearing positioned between the first harmonic reducer and the wrist for supporting the wrist.

17. The robot arm assembly as claimed in claim 14, wherein the first belt transmission assembly comprises an input belt wheel, an output belt wheel, and a transmission belt; the input belt wheel is coupled to the output end of the first driver and is driven by the first driver to rotate; the output belt wheel is secured to a distal end of the first rotary shaft; the transmission belt is mounted to the input belt wheel and the output belt wheel for connecting the input belt wheel and the output belt wheel together.

18. The robot arm assembly as claimed in claim 11, wherein the robot arm assembly further comprises a second transmission mechanism assembled within the wrist housing, for transferring a rotation movement of the second driver to the rotary member; the second transmission mechanism further comprises a second belt transmission assembly, and a third rotary shaft; the second belt transmission assembly is positioned at a same side as the other support arm opposite to the first belt transmission assembly, for coupling the second driver and the wrist together; the second rotary shaft is assembled within the first sleeve body; the second sleeve body defines a third shaft hole perpendicular to and communicates with the first and second shaft holes; the third rotary shaft is assembled within the third shaft hole and engages with the second rotary shaft; the rotary member is mounted to a distal end of the third rotary shaft.

19. The robot arm assembly as claimed in claim 18, wherein the second transmission mechanism further comprises a drive bevel gear mounted to the second rotary shaft, and a driven bevel gear mounted to the third rotary shaft; the driven bevel gear engages with the drive bevel gear.

\* \* \* \* \*